United States Patent [19]

Mitsumoto

[11] Patent Number: 5,050,555
[45] Date of Patent: Sep. 24, 1991

[54] SYSTEM AND METHOD FOR CONTROLLING IGNITION TIMING FOR INTERNAL COMBUSTION ENGINE IN WHICH ALCOHOL IS MIXED WITH GASOLINE

[75] Inventor: Hisashi Mitsumoto, Kanagawa, Japan

[73] Assignee: Nissan Motor Company, Limited, Yokohama, Japan

[21] Appl. No.: 511,149

[22] Filed: Apr. 19, 1990

[30] Foreign Application Priority Data

Apr. 24, 1989 [JP] Japan ................ 1-105609

[51] Int. Cl.$^5$ .............................. F02P 5/15
[52] U.S. Cl. .................... 123/422; 123/425
[58] Field of Search ......... 123/425, 435, 1 A, 422; 73/35

[56] References Cited

U.S. PATENT DOCUMENTS

| | | | |
|---|---|---|---|
| 4,640,249 | 2/1987 | Kawamura et al. | 123/425 |
| 4,660,535 | 4/1987 | Asano | 123/425 |
| 4,905,649 | 3/1990 | Washino et al. | 123/435 |

FOREIGN PATENT DOCUMENTS

61-14479  1/1986  Japan .
61-85578  5/1986  Japan .
1-159175 11/1989  Japan .

Primary Examiner—Tony M. Argenbright
Attorney, Agent, or Firm—Foley & Lardner

[57] ABSTRACT

A system and method for controlling ignition timing for a lean burn type internal combustion engine in which alcohol is mixed with gasoline. A final ignition timing value ADV is determined from a basic ignition timing value BASE, a feedback correction quantity $\Delta_1$, plus a second correction quantity $\Delta_2$, the basic ignition timing value being derived for conventional fuel (gasoline) on the basis of the operating conditions of an engine having a driving region in which the engine is driven with a lean air/fuel mixture ratio. The second correction quantity, $\Delta_2$, is derived according to an estimated value of a percentage R of mixture of an alternative fuel (alcohol) to the conventional fuel (gasoline).

11 Claims, 7 Drawing Sheets

SYSTEM AND METHOD FOR CONTROLLING IGNITION TIMING FOR INTERNAL COMBUSTION ENGINE IN WHICH ALCOHOL IS MIXED WITH GASOLINE

BACKGROUND OF THE INVENTION (1) Field of the invention

The present invention relates generally to a system and method for controlling ignition timing for an internal combustion engine. The present invention particularly relates to the system and method described above applicable to a so-called, lean burn engine, i.e., an air/fuel mixture having a lean air/fuel mixture ratio and having any kind of alcohol, blended with gasoline as its fuel is ignited and burned.

(2) Background of the art

Various types of ignition timing control systems have been proposed for internal combustion engines using gasoline as fuel thereof.

Previously proposed ignition timing control systems have generally been divided into two categories: one category being such that the ignition timing is controlled (MBT control: Minimum Advance For Best Torque control) so that a crank angular position (so called, $\theta_{pmax}$) at which inner cylinder pressure becomes maximum corresponds to an angular range, generally of the compression stoke, in which engine torque generation is maximum, usually ATDC 10° to ATDC 20° (ATDC=After Top Dead Center); the other category being such that the ignition timing is controlled (knock avoidance control) to move toward a retardation angle to prevent recurrence of engine knocking when a knock signal produced from the engine on the basis of an inner cylinder pressure indicative signal has a level exceeding a predetermined value.

In addition, in another previously proposed ignition timing control system, combination of both MBT and knock avoidance controls has beem adopted as well as a specially designed MBT control for a multi-cylinder engine.

The latter is disclosed in a Japanese Patent Application First Publication Showa 61-14479 published on Jan. 22, 1986.

In the previously proposed ignition timing control system disclosed in the above-identified Japanese Patent Application First Publication, the ignition timing control is started in accordance with a pressure (inner cylinder pressure) signal derived from any one of the engine cylinders in which an anti-knock characteristic is relatively high and when MBT control becomes impossible due to the generation of the engine knock in the cylinder described above, the pressure signal derived from any other cylinder in which the anti-knock characteristic is also relatively high is alternatively selected. Since such a technique as described above achieves an assured MBT control in any cylinder in which no knock occurs, the rate of fuel consumption is reduced and control is simplified, as compared with a case where adoption of an average value of the crank angular position $\theta_{pmax}$ (the average value is a value which is deviated slightly from the real MBT).

In the case of adoption of the average value, the average value is calculated for four cylinders from the most recent $\theta_{pmax}$ sequentially detected for each cylinder and the ignition timing for each cylinder is calculated on the basis of the average value. Therefore, if knocking has occurred in one of the cylinders the ignition timing for the other cylinders in which no knocking occurred is unnecessarily retarded.

Since, however, the ignition timing control systems described above are applied to an engine in which gasoline (conventional fuel) is used as fuel, the ignition timing would greatly deviate from an optimum ignition timing due to a difference in fuel characteristics present, such as when gasoline is mixed with an alcohol (alternative fuel).

Hereinafter, an engine employing a blend of conventional and alternative fuels will be referred to as a mixed fuel engine.

Even in the previously proposed ignition timing control systems, it is possible to control the ignition timing toward an optimum ignition timing for alcohol or alcohol mixed gasoline using ignition timing characteristics for the gasoline provided that the engine operating conditions are in a steady state. Although, when alcohol mixed gasoline is used, deviations in the ignition timing characteristics occur corresponding to a fuel-alcohol mixture ratio, such deviations would soon be eliminated due to use of a feedback control system in the construction of the ignition timing control system.

However, the engine driving situation becomes different in the case of transient engine driving conditions. This will be explained in the detailed description.

For example, suppose a situation where an alcohol (alchohol content is 100%) only is used as fuel, the optimum ignition timing angle characteristic applied to the gasoline fuel being stored in a memory of the system as a basic ignition timing advance angle.

When the engine operating condition falls in a high load state, the basic ignition timing advance angle in the case of the gasoline fuel is largely retarded from that in the case of the alcohol fuel by 5° to 10°.

Hence, immediately after an accelerator pedal is abruptly depressed from a low load position to the highest load (fully open) position (abrupt acceleration), ignition timing is controlled with the ignition timing angle largely retarded from an optimum position due to a response delay in the ignition timing. Therefore, the fuel is wastefully consumed and engine output is insufficiently produced. In the same way, immediately after the accelerator pedal is released from its highest load position (abrupt deceleration), the ignition timing control is, in turn, carried out with the ignition timing angle largely retarded from the optimum position due to the response delay. Therefore, ar excessive advance angle of the ignition timing occurs, and consequent engine knocking could occur.

As described above, in the case of the engine transient operating conditions, it becomes impossibe to utilize the basic ignition angle advance angle applied to the gasoline fuel for the optimum ignition advance angle applied to the alcohol or alcohol mixed fuel at the time of the engine transient operating conditions due to the response delay described above.

Another ignition timing control system has been proposed which utilizes a sensor (or program) which detects (monitors) fuel characteristics. The other ignition timing control system deals with the response delay, switching basic ignition timing advance angle maps according to detected fuel characteristics. This is exemplified by a Japanese Patent Application First Publication Showa 61-85578 Published on May 1, 1986.

However, if the same technique as disclosed in the above-described JP First Publication (Showa 61-85578)

is applied to alcohol mixed fuel engines, a tremendous amount of memory capacity is required. This is because as is different from the disclosed ignition timing control system which determines whether a high-octane gasoline or normal (regularly, low-octane number) gasoline is used and changes basic ignition timing characteristics according to the result of that determination, the ignition timing advance angle characteristics are largely changed in accordance with the change of alcohol concentration (content of alcohol) in the fuel. Therefore, many ignition timing advance angle characteristic maps are required to be selectively used for providing the optimum ignition timing.

In addition, the program (or sensor) for determining the fuel characteristics described above is installed, an increase in cost of assemblying the ignition timing control system is involved. If new fuel is supplied to the engine and fuel characteristics are accordingly changed, the fuel characteristic actually injected into the engine becomes different from that during the new supply of fuel. In the same way, if an alcohol concentration sensor is installed in the engine, the cost of assemblying the ignition timing control system is not only accordingly increased but also the alcohol concentration of the fuel actually injected into the engine becomes different from that detected by the sensor. Consequently, during the transient engine operating conditions, the optimum ignition timing cannot be achieved for the alcohol mixed fuel.

Hence, it is desired to provide an ignition timing control system for the alcohol mixed fuel which always determines the alcohol concentration with high accuracy and provides the ignition timing advance angle not largely deviated from the optimum ignition timing during the transient engine driving conditions with no new addition of sensors.

To meet this demand, such an ignition timing control system as disclosed n a Japanese Utility Model Registration Application First Publication Heisei 1-159175 published on Nov. 2, 1989 has been proposed.

The detailed explanation of the disclsoed ignition timing control system will be made later.

In the ignition timing control system disclosed in the above-identified Japanese Utility Model Registration Application First Publication, the alcohol concentration is always estimated even at the time of transient operating conditions (,i.e., during the engine acceleration).

Therefore, in a case where, e.g., the ignition timing control system is applied to a so-called, lean burn engine, in which fuel combustion is carried out at a considerably leaner air-fuel mixture ratio deviated from a stoichiometric air-fuel mixture ratio, mis-firing will probably occur.

If mis-firing occurs, the following disadvantages are also likely to occur, indicating further improvements are needed. That is to say, if mis-firing occurs, the combustion state becomes an air cycle (a high amount of air and an extremely small amount of fuel) and the value of $\theta_{pmax}$ is fixed to TDC in the compression stroke. Therefore, the timing Total ADVance (TADV = DADV/N × C, C: constant, N denotes the number of engine revolutions per minute (RPM), and DADV denotes $\theta_{pmax}$ − STADV, STADV being the final ignition timing angle set for combustion when $\theta_{pmax}$ is detected.) becomes shortened. Since TADV can be deemed to represent a quantity of a combustion duration from a time at which the fuel is burnt to a time at which the combustion of fuel is generally ended and the shortened TADV can mean that the concentration of alcohol R becomes high. In the above proposed system, during transient driving conditions the alcohol concentration R is assumed to be high even if a fairly low alcohol concentration is actually present since the shortened TADV means the high concentration of alcohol, this means the ignition timing is not controlled to an optimum value and engine driveabilty and exhaust emission characteristics become worsened.

SUMMARY OF THE INVENTION

It is, therefore, an object of the present invention to provide a system and method for controlling ignition timing for ar internal combustion engine which can prevent impairment of engine driveability and exhaust emission characterstics and avoid inappropriate ignition timing during transient driving conditions, for a mixed fuel engine, even if a very low ratio of alcohol to gasoline is used.

The above-described object can be achieved by providing a system for controlling an ignition timing for an internal combustion engine, comprising: a) first means for detecting engine driving conditions, the engine being driven with a particular fuel containing an alternative fuel, the engine having a lean air/fuel mixture ratio; b) second means for detecting an inner cylinder pressure of the engine; c) third means for detecting whether the engine operating conditions fall in a predetermined transient operating state; d) fourth means for setting a basic ignition timing for the particular fuel on the basis of the engine operating conditions; e) fifth means for detecting a crank angular position at which the inner cylinder pressure becomes maximum on the basis of an output signal derived from the second means; f) sixth means for calculating an ignition timing feedback correction quantity $\Delta_1$ for the ignition timing for avoiding occurrence of engine knock and/or generating a maximum torque as derived from the signal of the second means; g) seventh means for comparing the crank angular position at which the inner cylinder pressure becomes maximum with the current ignition timing to estimate a percentage of alternative fuel to the particular fuel and halting the estimation when the engine is transferred into the predetermined transient condition; h) eighth means for calculating a second correction quantity $\Delta_2$ for the ignition timing according to the estimated percentage of mixture of the alternative fuel; i) ninth means for correcting the basic ignition timing using the first and second correction quantities to determine a final ignition timing; and j) tenth means for igniting the air/fuel mixture supplied to the engine at a time derived by the ninth means.

The above-described object can also be achieved by providing a method for controlling ignition timing for an internal combustion engine, comprising the steps of: a) detecting engine driving conditions, the engine being driven with a fuel containing a particular fuel and alternative fuel and the driving conditions including a range in which the engine is at least driven with a lean air/fuel mixture ratio; b) detecting an inner cylinder pressure of the engine; c) detecting whether the engine operating conditions fall in a transient operating state; d) setting a basic ignition timing for particular fuel on the basis of the engine operating conditions; e) detecting a crank angular position at which the inner cylinder pressure becomes maximum on the basis of an output signal derived in the step b); f) calculating an ignition timing feedback correction quantity for the ignition timing for at least avoiding occurrence of engine knock and/or generating maximum torque as derived from the signal of step b); g) comparing the crank angular position at which the inner cylinder pressure becomes maximum with the current ignition timing to estimate the percentage of alternative fuel to particular fuel and halting the estimation when the engine is transferred into the predetermined transient driving condition; h) calculating a second correction quantity for the ignition timing according to the estimated percentage of mixture; i) correcting the basic ignition timing using the first and second correction quantities to determine a final ignition timing; and j) igniting the air/fuel mixture supplied to the engine on the basis of the determination made in the step i).

DETAILED DESCRIPTION OF THE PREFERRED EMBODIMENTS

Reference will hereinafter be made to the drawings in order to facilitate a better understanding of the present invention.

Figure 10:
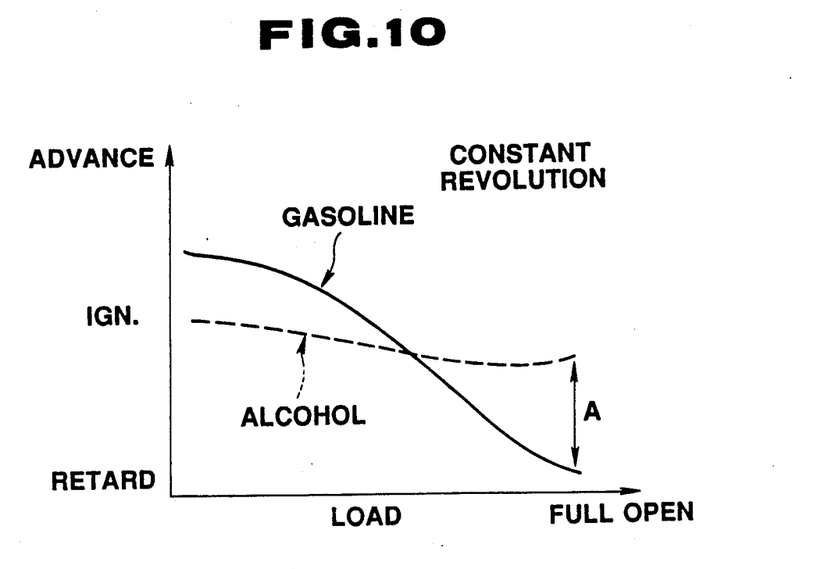
FIG. 10 is a characteristic graph representing optimum ignition timings for gasoline fuel and for alcohol fuel with respect to engine loads with an engine revolutional speed being constant.

First, FIG. 10 shows optimum ignition timing characteristics for single fuels, i.e., for a gasoline only and for an alcohol only when an engine revolutional speed remains constant.

As shown in FIG. 10, since in the case of alcohol fuel (denoted by a broken line) an initial combustion speed is fast during low engine loads, the ignition timing which is retarded as compared with that in the case of the gasoline fuel (denoted by a solid line) becomes optimum. On the other hand, when the engine load becomes high, the optimum ignition timing value for the gasoline fuel becomes largely retarded due to the engine being susceptible to engine knock under high loads. However, since an anti-knock characteristic of the engine becomes high using the alcohol fuel, there is almost no need to retard the ignition timing.

Hence, the ignition timing versus load characteristics are mutually reversed between a low load and high load areas in using both gasoline and alcohol fuels.

Figure 11:
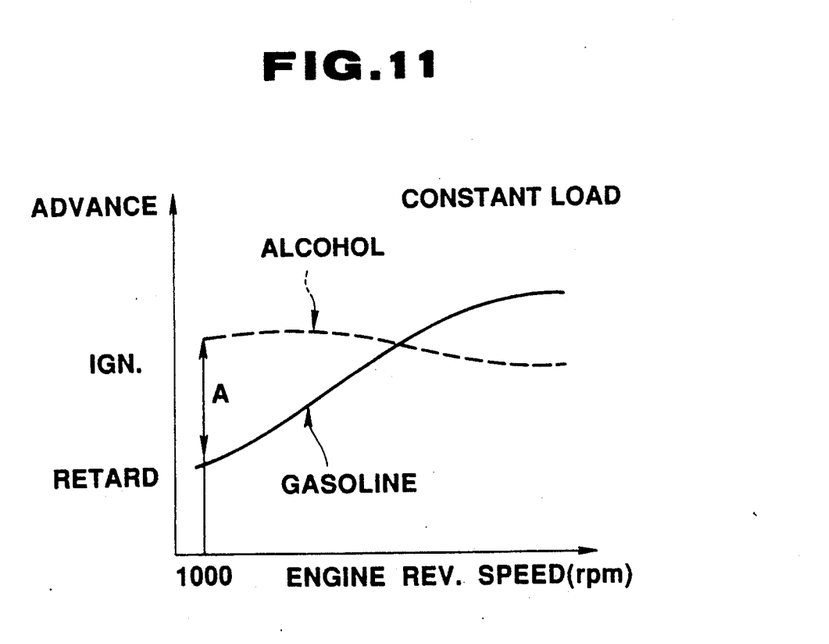
FIG. 11 is a characteristic graph representing optimum ignition timings for gasoline fuel and for alcohol fuel with the engine revolution speed, with the engine load being constant.

FIG. 11 shows optimum ignition timing versus engine revolutional speed characteristics for both alcohol and gasoline fuels, when the engine load remains constant.

In the case of the alcohol (broken line) fuel, the ignition timing can considerably be advanced as against the case of the gasoline fuel (solid line), as shown in FIG. 11, when the engine revolution speed is low.

As the engine revolution speed is increased, the occurrence of engine knocks becomes rare in the case of the gasoline fuel, as well as the alcohol fuel so that a gradual advance in the ignition timing becomes possible in the case of the gasoline fuel.

Consequently, the ignition timing versus engine revolutional speed characteristics are also reversed at the time of the high engine revolution speed n using both gasoline and alcohol fuels.

It is noted that FIG. 10 shows an example of a constant engine revolution speed (1000 rpm) and FIG. 11 shows an example of a constant engine load (a fully open engine throttle valve, provided that a turbo charger is not installed). It is also noted that a symbol A in FIG. 11 denotes a crank angular deviation between the ignition timings in the case of the gasoline and alcohol fuels when the engine revolution speed N is 1000 rpm and symbol A in FIG. 10 denotes the same crank angular deviation between those in cases of gasoline and alcohol fuels when an engine throttle valve is fully open.

As appreciated from FIGS. 10 and 11, it is possible to control the ignition timing to the optimum ignition timing for the alcohol or alcohol mixed fuel using the ignition timing characterstics (denoted by the solid lines in FIGS. 10 and 11) for the gasoline fuel on condition that the engine is n a steady state (not transient state) state. If these alcohol or alcohol mixed fuels is used, a deviation of the ignition timing based on the difference from the gasoline will occur at an initial stage of ignition. This deviation will soon be eliminated, since the ignition timing control system is constituted by a feedback loop control.

However, the situation becomes different at the time of transient engine driving conditions.

For example, suppose a case where the alcohol is used with the optimum ignition timing characteristics to the gasoline fuel is stored in a memory as a basic ignition timing. Then, according to the ignition timing versus load characteristics shown in FIG. 10, the ignition timing in the case of gasoline fuel is largely deviated from that in the case of alcohol fuel at the time of high engine load toward a retardation angle side (5° to 10°), as denoted by A of FIG. 10.

Hence, since the ignition timing is controlled, with the ignition timing largely retarded from the optimum point due to a response delay immediately after the throttle valve is abruptly opened (an accelerator pedal is abruptly depressed) toward a fully open position during a low engine load (the engine load is abruptly increased), fuel is wastefully consumed and engine output torque is insufficiently derived. In the same way, if the throttle valve is abruptly returned to a zero state (fully closed position), the control is, in turn, carried out, largely retarded from the optimum ignition timing. Therefore, an excessive advance in the ignition timing angle value occurs and engine knock often occurs.

FIGS. 1 to 5 show a prior art ignition timing control system. Its operation and characteristics are disclosed in a Japanese Utility Model Registration Application First Publication Heisei 1-159175 published on Nov. 2, 1989.

Figure 1:
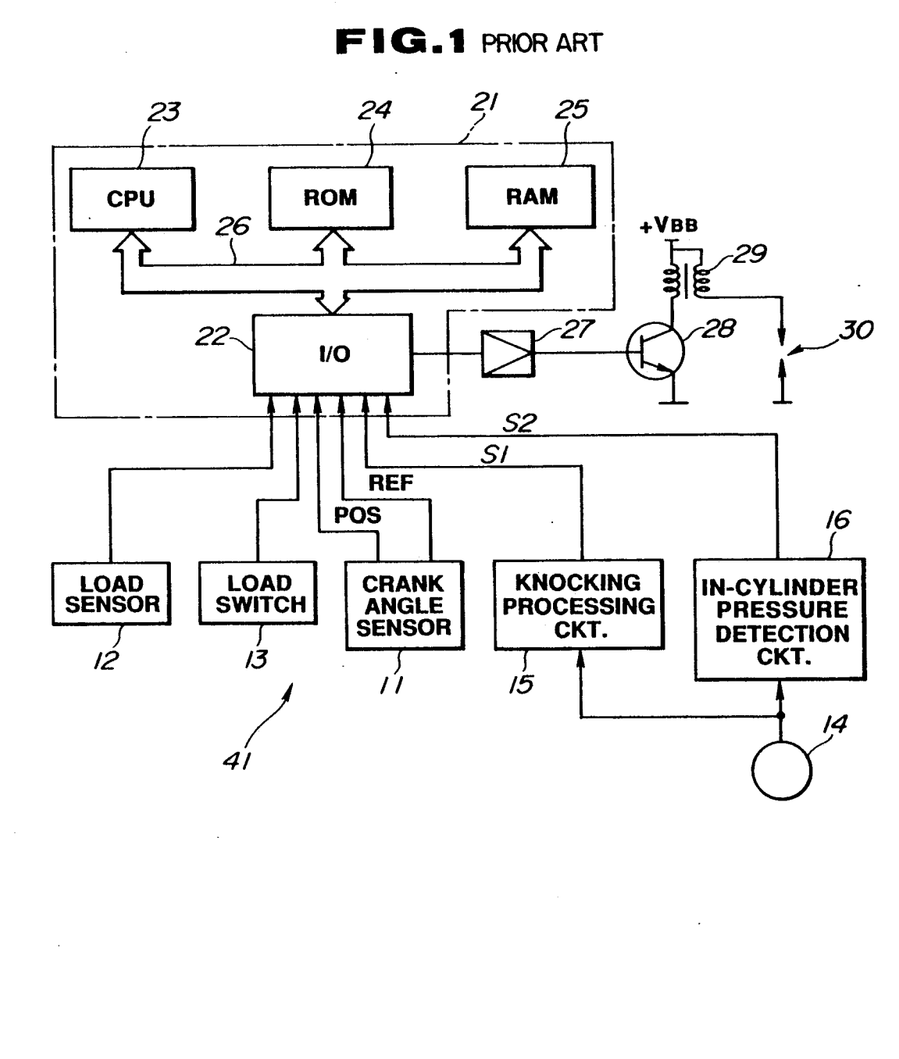
FIG. 1 is a circuit block diagram of a previously proposed ignition timing control system as disclosed in Japanese Utility Model Registration Application First Publication Heisei 1-159175 published on Nov. 2, 1989.

In FIG. 1, a crank angle sensor 11 produces a POS signal whenever an engine crankshaft rotates through a unit crank angle (e.g., 1°) and produces a REF signal whenever a cylinder piston reaches a reference position of a crank angle (for example, a predetermined position before a top dead center (BTDC) in a compression stroke). The crank angle signal POS is used to measure the engine revolution speed N. An engine load sensor 12 detects a load (for example, intake air quantity $Q_a$). $Q_a$ is a major parameter indicating an engine driving condition together with the engine revolution speed N. An ON-OFF signal from a load switch 13 (for example, an engine idling switch) is used as a sub parameter.

A washer type inner cylinder pressure sensor 14 is installed on a washer portion of an ignition plug installed in an engine cylinder. An output signal derived by the inner cylinder pressure sensor 14 is shaped into a knock signal $S_1$ and inner cylinder pressure signal $S_2$ in a knock processing circuit 15 and inner cylinder pressure detecting circuit 16, respectively. Then, both signals $S_1$ and $S_2$ are supplied to an Input/Output (I/0) Port 22 of a control unit 21. The sensor 14 functions as a combustion state sensor. A feedback correction quantity $\Delta_1$ 1 for the ignition timing is derived on the basis of the signals $S_1$ and $S_2$.

The control unit 21 includes a microcomputer having the I/0 port 22, CPU (Central Processing Unit) 23, ROM (Read Only Memory) 24, and RAM (Random Access Memory) 25. A signal transfer between these units in the control unit 21 is carried out via a bus 26.

Figure 2:
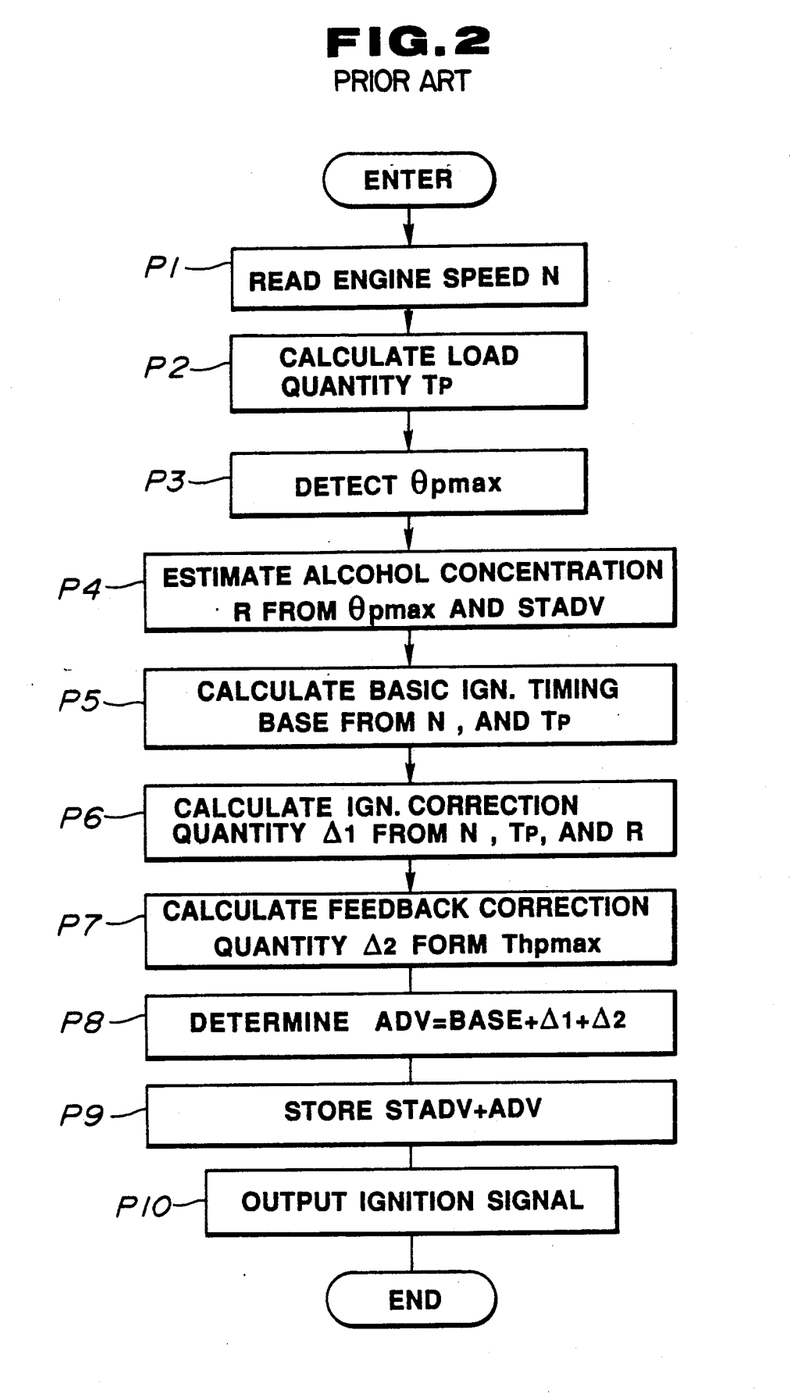
FIG. 2 is an operational flowchart executed by a control unit shown in FIG. 1.

The control unit 21 executes a given operation on the basis of a program shown in FIG. 2, utilizing an engine driving condition signal (load signal, POS signal, and REF signal) and a feedback signal of $S_1$ and $S_2$ and sets a final ignition timing. An ignition pulse is prepared from the final ignition timing and output to power transistor 28. It is noted that numeral 27 denotes an output amplifier, 29 denotes an ignition coil, and 30 denotes the ignition plug.

It is also noted that although FIG. 1 shows only the ignition timing control system for a single cylinder, in the case of a multi-cylinder engine, the elements 11, 14, 16, and output circuit 27 to 29 are respectively plural corresponding to the number of cylinders.

The structures of the inner cylinder pressure sensor 14, inner cylinder pressure detecting circuit 16, and knock processing circuit 15 are exemplified by a U.S. Pat. No. 4, 660, 535 issued on Apr. 28, 1987, the contents of which is hereby incorporated by reference.

FIG. 2 shows the program of setting the final ignition timing executed by the control unit 21.

In a step $P_9$ of FIG. 2, a final ignition timing advance angle (ADV) is determined from a sum of two correction quantities ($\Delta_1$ and $\Delta_2$) for the ignition timing and the basic ignition timing advance angle (BASE).

That is to say, $ADV = BASE + \Delta_1 + \Delta_2$

A numerical value representing a crank angle With respect to a compression stroke Top Dead Center is adopted for the value of the ignition timing advance angle.

Hence, in a case where either of $\Delta_1$ or $\Delta_2$ is positive, the ignition timing is advanced and, to the contrary, either of the two correction quantities is negative, ignition timing is retarded.

The symbol BASE defines an optimum ignition timing for the gasoline without mixing with the alcohol and read out from a table map (,e.g., FIGS. 10 and 11) with the engine driving conditions (N and $T_p$) as parameters (steps $P_1$, $P_2$, and $P_3$).

It is not necessary to carry out a new matching to derive BASE although the ignition timing control system is applied to the engine using the alcohol mixed gasoline. BASE can directly be used which has been used for the conventional gasoline fuel.

It is noted that a basic ignition pulsewidth $T_p$ ($= K \times Q_a/N$, provided that K denotes a constant determining a value of the air-fuel mixture ratio) corresponds to a quantity corresponding to the engine load and simultaneously denotes a basic value in a fuel injection quantity and timing control (step $P_2$).

Next, $\theta_{pmax}$ denotes a crank angle at which the inner cylinder pressure is A/D converted for each 1° between a predetermined crank angular interval (TDC to ATDC), as disclosed in the U.S. Pat. No. 4,640,249 issued on Feb. 3, 1987 (step $P_7$). The contents of the above-identified United States Patents are hereby incorporated by reference.

Furthermore, the final ignition timing ADV is stored into the memory as STADV which is set for the combustion subjected to the detection of $\theta_{pmax}$ (step $P_9$). For each combustion, the comparison between the ignition timing STADV and $\theta_{pmax}$ becomes possible.

Pay attention to a quantity TADV which is a conversion of a difference DADV (DADV $= \theta_{pmax} -$ STADV) between $\theta_{pmax}$ and STADV into time: (TADV $=$ DADV/N $\times$ C, C denotes a constant).

The value of TADV can be deemed to represent a combustion duration from a time of the actual ignition of fuel to a time of a substantial finish of fuel combustion, as explained in the BACKGROUND OF THE INVENTION. The alcohol mixed gasoline fuel has a tendency of increasing a combustion speed as the alcohol content percentage (alcohol concentration) R is increased.

Figure 3:
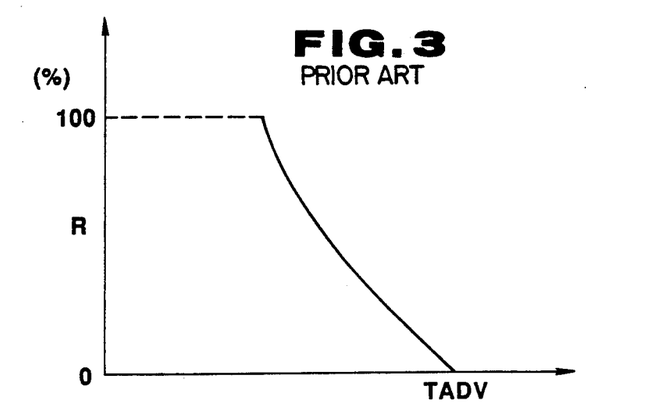
FIG. 3 is a characteristic graph representing relationship between TADV (combustion duration) and R alcohol concentration) used in the system shown in FIG. 1.

Therefore, a correlationship between TADV and R is established as shown in FIG. 3.

Hence, R can be estimated by calculating TADV through the control unit (step $P_4$). The value of R can be derived from a table shown in FIG. 3 which is stored in the memory (ROM 24) so as to be fetched therefrom using the value of TADV.

In addition, in the step $P_4$, an accuracy of the value of R can be increased by carrying out the calculation of R when an engine coolant temperature of the engine indicates above a predetermined value, e.g., 80° C., the engine revolution speed falls in a range from, e.g., 2000 to 3000 rpm, and an air-fuel mixture ratio feedback control is being carried out.

The determination of the value of R means only the determination of positions of the broken lines in FIGS. 10 and 11. Therefore, since when the engine load and engine revolutional speed become different, deviations (correction quantities) of the broken lines from the solid lines also become different. To specify the deviation quantity, it is necessary for the instantaneous engine load to determine the value R according to the engine revolution speed. It is noted that the broken lines used in the case of above-described alcohol is supposed to be the ignition timing characteristic to the alcohol mixed gasoline having the percentage content of R.

The correction quantity $\Delta_2$ is, in this example, derived from a sum of $\Delta_{22}$ and $\Delta_{21}$ derived respectively using the ignition timing characteristic curves shown in FIGS. 10 and 11.

The correction quantity $\Delta_{22}$ derived from FIG. 10 is a value that converts the ignition timing characteristic (solid line) for the gasoline in FIG. 10 into that (broken line) for the alcohol mixed gasoline.

For $\Delta_{22}$, a value corresponding to a difference between the solid line and broken line is selected with the engine load as a variable.

For example, the value of $\Delta_{22}$ indicates negative since it is necessary to make the ignition timing retard at a left side with respect to a point of intersection across which two solid and broken curved lines are intersected, as appreciated from FIG. 10. In addition, as the engine load becomes low, the absolute value of $\Delta_{22}$ becomes larger. On the contrary, since the ignition timing needs to become advanced at a right side with respect to the point of intersection, the value of $\Delta_{22}$ indicates positive. As the engine load is increased, the value of $\Delta_{22}$ needs to become larger.

It is noted that since the position of the broken line of FIG. 10 with respect to the engine load is moved when the value of R is changed, the value of $\Delta_{22}$ is accordingly changed.

This means that an axis is present in which R is variable in a direction perpendicular to a paper surface in FIG. 10. Consequently, what is derived from FIG. 10 is that $\Delta_{22}$ is defined with the load and conentration of alcohol R being parameters.

Figure 4:
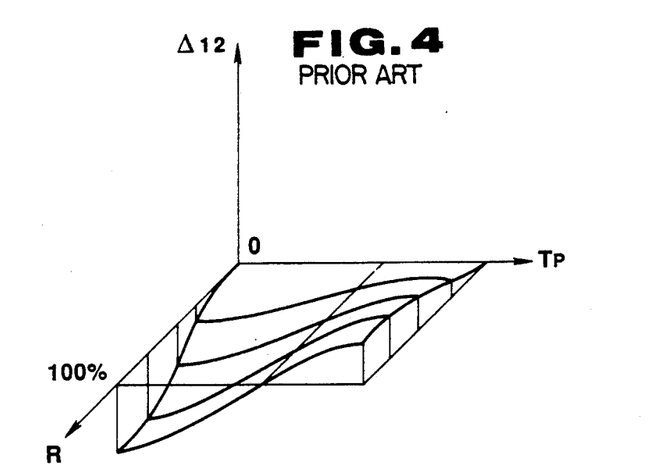
FIG. 4 is a characteristic graph representing the contents of a correction quantity $\Delta_{22}$ for the ignition timing angle used in the system shown in FIG. 1.

FIG. 4 shows a correction quantity characteristic of $\Delta_{22}$ in which a gradient of the curved lines is large as the increase in the value of R.

Figure 5:
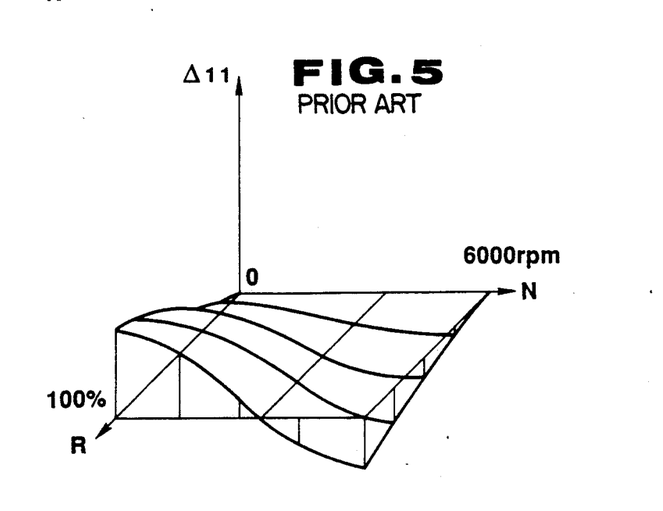
FIG. 5 is a characteristic graph representing the contents of another correction quantity $\Delta_{21}$ for the ignition timing angle used in the system shown in FIG. 1.

In the same way, the correction quantity $\Delta_{21}$ derived from FIG. 11 is determined with the engine revolution speed N and R being parameters. Its correction quantity characteristic is shown in FIG. 5. It is noted, however, that since in FIG. 11 the relative position of two curved lines are reversed as is different from FIG. 10, the gradient shown in FIG. 5 is reversed as against that in FIG. 4.

It is noted that FIGS. 4 and 5, in a case here R=0%, the correction quantity (i.e., zero) for the gasoline fuel is used and in a case of R=100%, the correction quantity. (a deviation between solid and broken lines in FIGS. 10 and 11) for the alcohol fuel is used.

Hence, since even if the fuel having an unknown alcohol content percentage is used, the alcohol content percentage R is estimated as appreciated from FIG. 3. Then, the values of $\Delta_{21}$ and $\Delta_{22}$ are defined from the alcohol concentration R percentage and the instantaneous engine driving conditions. Therefore, an optimum ignition timing can be provided for any fuel having the alcohol mixture ratio according to a value BASE+$\Delta_{21}$+$\Delta_{22}$) corrected from the values of $\Delta_{21}$ and $\Delta_{22}$.

To derive the values of $\Delta_{21}$ and $\Delta_{22}$, table maps having the contents of the characteristics shown in FIGS. 4 and 5 are stored in a memory (the ROM 24). In the same way as the case of reading BASE, $\Delta_{21}$ is read from N and R and $\Delta_{22}$ is read from $T_p$ and R, respectively.

These looked-up values $\Delta_{21}$ and $\Delta_{22}$ are added to derive $\Delta_2$.

Next, $\Delta_1$ denotes a feedback correction quantity for the ignition timing. For example, $\Delta_1$ is given as a sum between the correction quantity $\Delta_{11}$ by means of the knock avoidance control and the correction quantity $\Delta_{12}$ by means of the MBT control. Then, the addition of $\Delta_1$ to BASE means that the ignition timing control system is constituted by the feedback loop system (step $P_6$ of FIG. 2).

It is advantageous that the feedback control offsets a control error caused by an open loop control.

In other words, since a control mode using (BASE+$\Delta_2$) is an open loop control mode, the error is often generated in the correction quantity of open loop $\Delta_2$.

However, such an error in the correction quantity is absorbed (compensated) by means of the feedback correction quantity $\Delta_1$.

Since the high accuracy of the ignition timing control is assured through the correction for the ignition timing by means of the other correction quantity $\Delta_1$, a high accuracy for the value of $\Delta_2$ is not so required. That is to say, the correction therefor by means of $\Delta_2$ may be rough. Consequently, a number of lattice points which store the values of $\Delta_{21}$ or $\Delta_{22}$ may be reduced. The memory capacity for $\Delta_2$ may accordingly be reduced.

Various techniques which have been adapted to gasoline in the previously proposed ignition timing control systems can be applied to the knock avoidance control and to the MBT control to derive the correction quantity $\Delta_1$. For example, if the knocking is present, the ignition timing needs to be largely retarded. If no knocking occurs, a value by which the ignition timing is slightly advanced is $\Delta_{11}$. In addition, a value derived by carrying out a proportional operation on the basis of a deviation $\Delta\theta$ ($=\theta_r-\theta_{pmax}$) from $\theta_r$ (a value in the vicinity to ATDC15° (after a top dead center in a compression stroke) and at which an engine efficiency becomes maximum) may be adopted as $\Delta_{12}$. Furthermore, a technique disclosed in a Japanese Patent Application First Publication Showa 61-14479 published on Jan. 22, 1986 mat be adopted.

An operation of the ignition timing control system shown in FIG. 1 will be described.

In this example, the two correction quantities $\Delta_1$ and $\Delta_2$ have been adopted.

According to the one correction quantity $\Delta_2$, an optimum ignition timing is roughly provided for various kinds of mixed fuels having different content percentages of alcohol. In this case, the value of BASE +$\Delta_2$ is not such as to feed back the result of the combustion to the ignition timing control but as the result of the open loop control. This can provide for an optimum ignition timing without response delay at the initial stage of the transient operating condition.

The reason for roughing the optimum ignition timing is that the object of $\Delta_2$ lies in the improvement in response characteristic against the transient operating condition, rather than in accuracy. Although accuracy is rough, a sufficient response characteristic can be derived.

When the accuracy of $\Delta_2$ is made rough, the memory capacity of $\Delta_2$ may be reduced. A balance between the response characteristic and cost can be made.

On the other hand, according to the other correction quantity $\Delta_1$ the quantity of $\Delta_1$ is the feedback correction quantity. Therefore, at the steady state condition, high accuracy can be guaranteed. For example, even if the characteristic variations of the other sensors and aging characteristic change occur, and even if an engine characteristic such as a coolant temperature state changes, such changes are offset and a maximum torque can be achieved in a range in which no knocking occurs.

In other words, the requirement for control is high response characteristic and high accuracy. However, both requirements are not compensated for by a single correction quantity. These correction quantities are separated. One correction quantity $\Delta_2$ provides a good response characteristic having a priority other than the accuracy to cope with the transient operating condition. The other feedback correction quantity $\Delta_1$ provides a high accuracy not derived by $\Delta_2$.

Consequently, even if a change width between the ignition timing characteristics is large as in the case of the alcohol mixed gasoline, the optimum ignition timing can speedily be provided in response to the change in the operating condition, with high accuracy and without increased cost.

In the previously proposed ignition timing control system disclosed in the Japanese Utility Model Registration Application First Publication Heisei 1-159175 published on Nov. 2, 1989, since the alcohol concentration R is estimated even under the transient operating condition (for example, at the time of engine acceleration), mis-firing may probably occur at the time of the transient operating condition in a case where the ignition timing control system is applied to the, so called, lean burn engine in which the combustion of fuel is carried out with a leaner air/fuel mixture ratio than the stoichiometric air/fuel mixture ratio from the viewpoint of the improvement in fuel economy. If the mis-fire occurs, the following disadvantages may occur and, therefore, more improvement is needed.

If mis-fire occurs, the combustion state enters the air cycle, Since $\theta_{pmax}$ is fixed at the upper top dead center in compression stroke, TADV becomes shorter. Hence, since the control unit determines that the alcohol concentration is high even if the fuel is gasoline, the ignition timing is not controlled to become the optimum value and engine driveability and exhaust gas emission characteristic may be reduced, as is explained in the BACKGROUND OF THE INVENTION.

FIGS. 6 through 9 show a preferred embodiment of the ignition timing control system according to the present invention.

It is noted that since the same reference numerals shown in FIGS. 6 through 9 as those shown in FIGS. 1 through 5 designate corresponding elements, the detailed description thereof will be omitted here.

Figure 6:
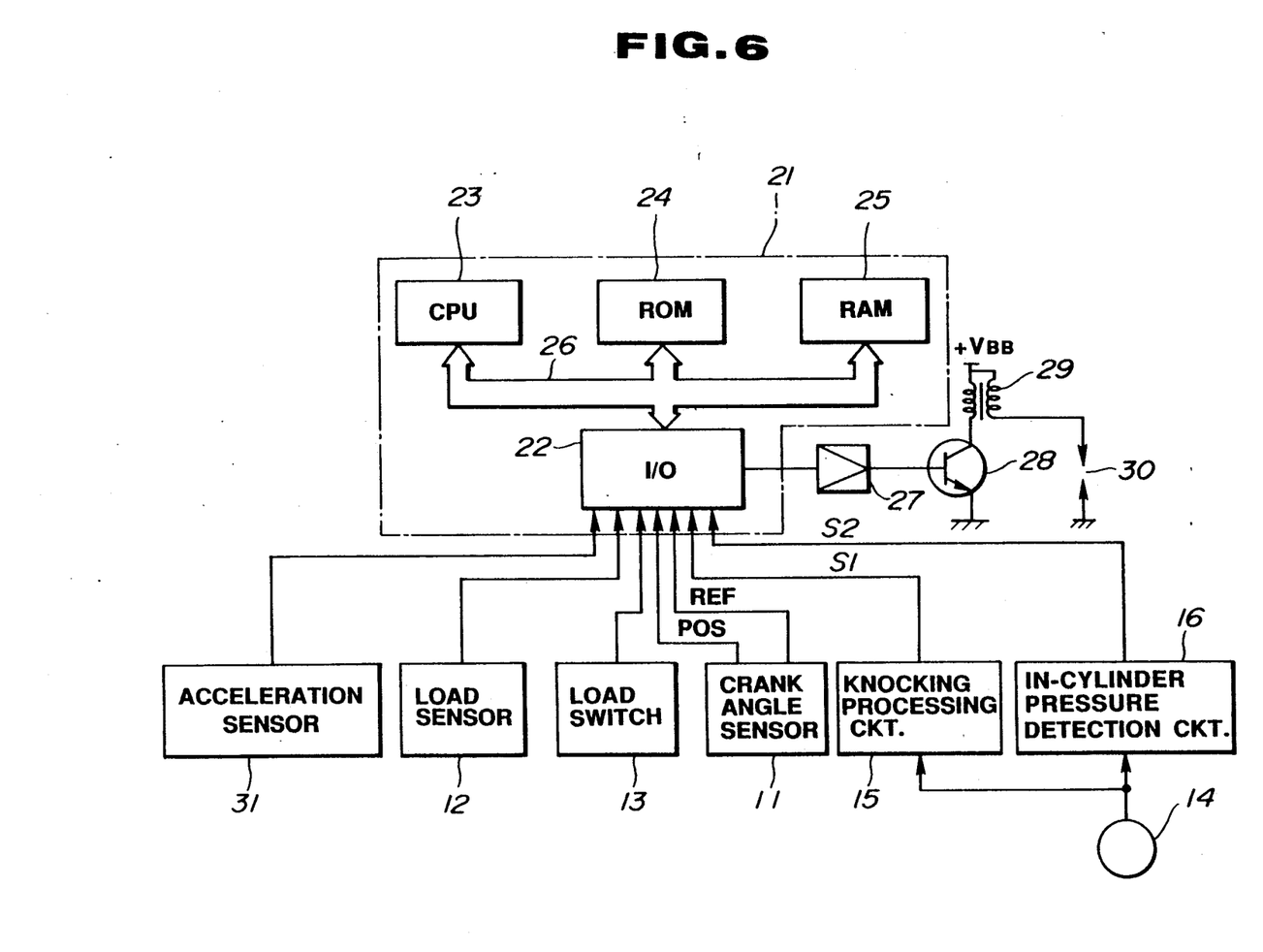
FIG. 6 is a circuit block diagram of an ignition timing control system in a preferred embodiment according to the present invention.
Figure 7:
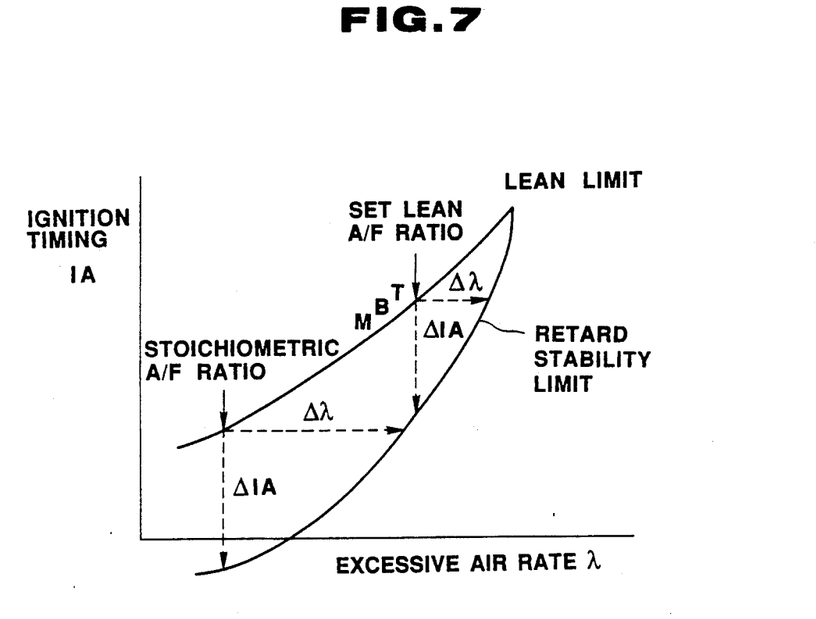
FIG. 7 is a characteristic graph representing limits of stability in the ignition timing angle.

FIG. 6 shows the circuit of the ignition timing control system in the preferred embodiment.

In FIG. 6, an acceleration sensor 31 is installed, as different from FIG. 1. An output signal of the acceleration sensor 31 is supplied to the I/0 port 21. The acceleration sensor 31 is constituted by, e.g., a throttle valve opening angle sensor.

The control unit 21 determines a predetermined acceleration state on the basis of a change rate of the throttle valve opening angle.

It is noted that when the engine operating state is transferred into the predetermined acceleration state, a processing of estimating an alcohol concentration R is stopped thereat. Then, on the basis of a previous estimation value (at the time of non-transient engine operating condition), the final ignition timing ADV is determined.

It is also noted that the engine to which the preferred embodiment is applied includes a lean burn in which the engine driving is carried out with a leaner air/fuel mixture ratio than the stoichiometric air/fuel mixture ratio at at least a part of engine driving region.

Figure 8:
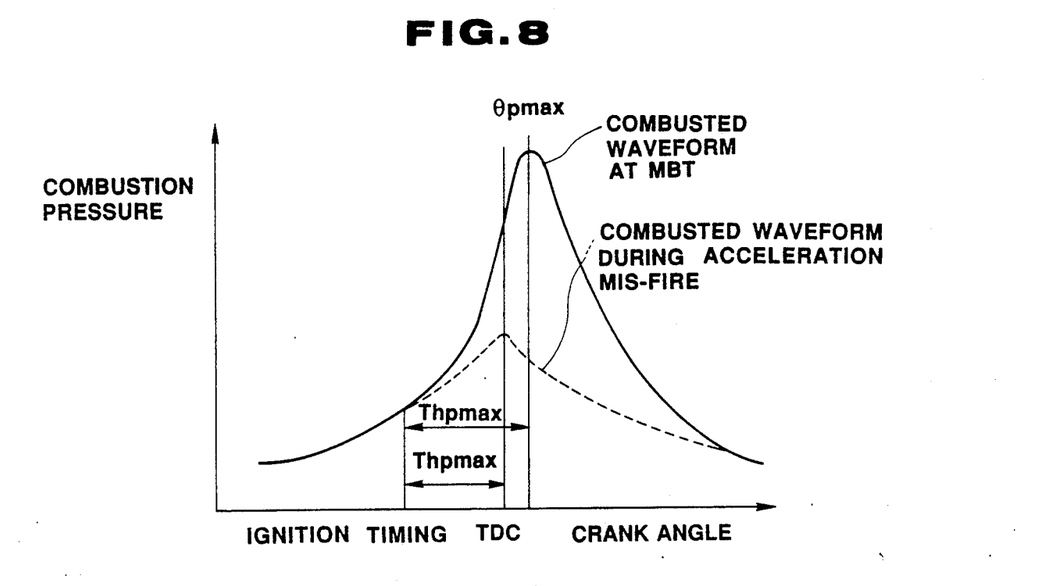
FIG. 8 is characteristic graphs of a combustion pressure waveforms in an MBT control and mis-firing during an engine acceleration with respect to the ignition timing angle.
Figure 9:
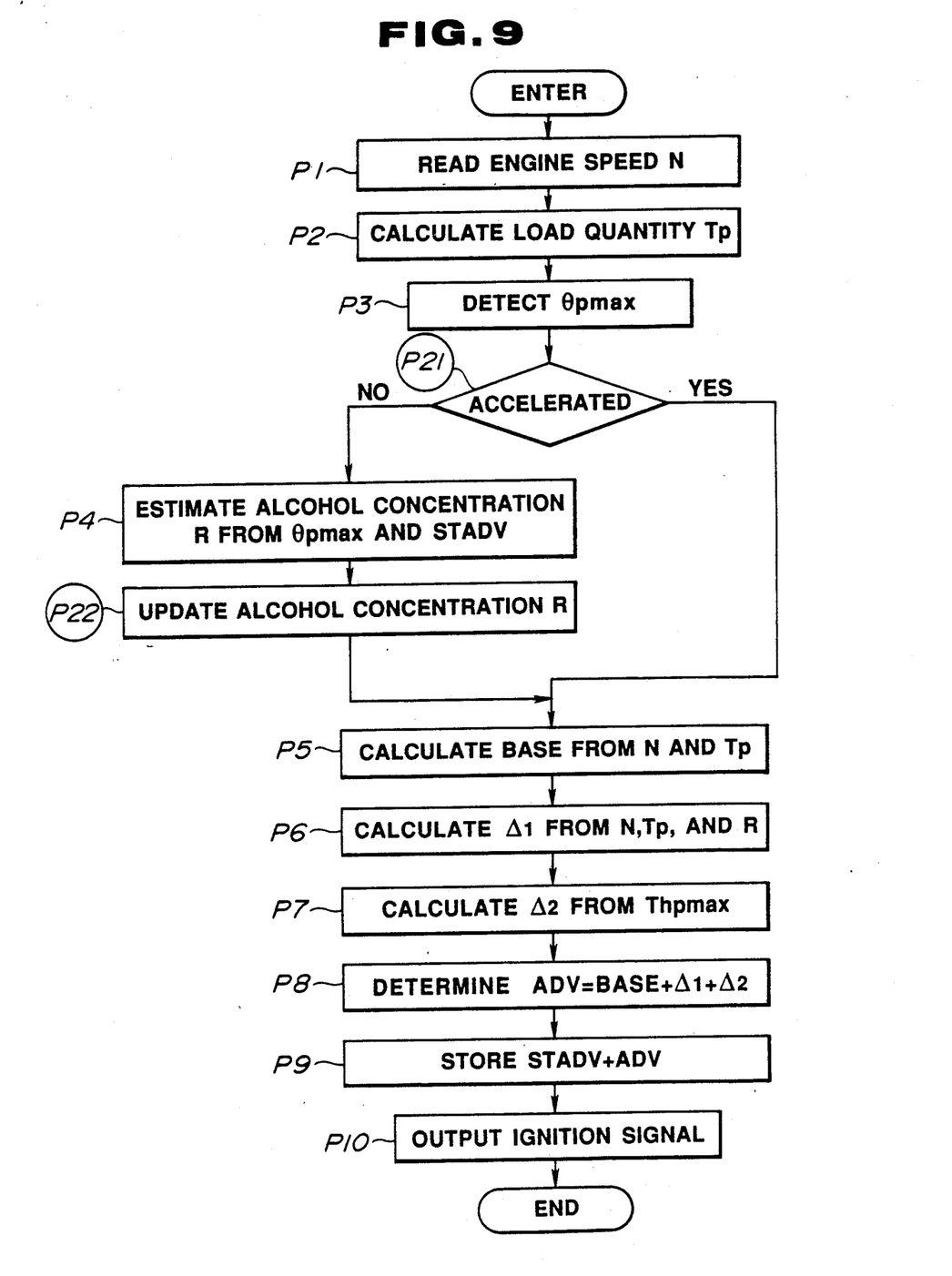
FIG. 9 is an operational flowchart executed by the control unit shown in FIG. 6.

FIG. 8 shows an air excessive percentage $\lambda$ of the engine, ignition timing (represented by IA), and its stability limit.

As appreciated from FIG. 8, an allowance width $\Delta\lambda$ of the air excessive percentage $\lambda$ in the stability limit and allowance width $\Delta$ IA of the ignition timing in the case of a set lean air/fuel mixture ratio are different from those in the case of the stoichiometric air/fuel mixture ratio. As the air/fuel mixture ratio is moved toward a leaner side, each allowance width becomes narrower with respect to the retard stability limit.

Hence, as the engine operating condition falls in an aruptly accelerated state, the air/fuel mixture ratio further becomes lean due to the delay in a supply of fuel into the engine. At last, the leaner air/fuel mixture ratio causes the ignition timing to exceed the stability limit and the probability of a mis-fire occurrence becomes high.

If the mis-fire occurs, the compression pressure becomes lower as compared with that in the MBT combustion, as shown in FIG. 3. Furthermore, since the combustion pressure Indicates the air cycle, $\theta_{pmax}$ approaches a top dead center (TDC) in compression stroke. Hence, Thpmax a crank angular interval between combustion start point and combustion pressure maximum point) naturally becomes also shorter. Hence, when the alcohol concentration R is estimated under such condition as described above, the control unit 21 estimates that the alcohol concentration R is 100% since the combustion duration is short. Consequently, the engine driveability becomes worse since the ignition timing does not exhibit an appropriate response.

In the preferred embodiment, when abrupt acceleration is detected, the estimation of alcohol concentration R will be stopped to solve the above-described problem.

A program of ignition timing control including such a processing as described above is shown in FIG. 4.

It is noted that steps which carry out the same processing as described in the previously proposed ignition timing control system disclosed in the Japanese Utility Model Registration Application First Publication Heisei 1-159175 have the same reference numerals and the steps in which the different processings are carried out are represented by steps $P_{21}$ and $P_{22}$.

After the step $P_3$, the control unit 21 determines whether the control unit 21 falls in the predetermined acceleration condition in the step $P_{21}$.

The processing carried out in the step $P_{21}$ is, e.g., such that if the change width of the opening angle of the throttle valve s above a set value, the control unit 21 determines that the engine operating condition falls in the acceleration state. If not in the acceleration state, t[e control unit 21 estimates the alcohol concentration R in the same way as the previously proposed ignition timing control system disclosed in the Japanese Utility Model Registration Application First Publication Heisei 1-159175. In the step $P_{22}$, the value R is updated and the routine advances the step $P_5$.

Hence, when the engine operating condition does not fall into the acceleration condition, the value of alcohol concentration R is updated whenever a routine of the program shown in FIG. 4 is repeated.

On the other hand, when the control unit 21 determines that the engine operating condition falls in the acceleration state in the step $P_{21}$, the routine jumps each step of $P_4$ and $P_{22}$ and advances the step $P_5$ and subsequent steps to stop the estimation of the alcohol concentration. Hence, the ignition timing is determined with the estimated value R at the time of the previous normal combustion state.

Therefore, even if mis-fire occurs, exceeding a lean limit during the acceleration under a lean burn driving condition, ignition timing can appropriately be maintained with no erroneous estimation of mixture ratio of fuel to the alcohol.

Consequently, engine driveability can be improved and reduction of exhaust gas emission characteristic prevented.

As described hereinabove, since in the ignition timing control system according to the present invention the estimation of alcohol concentration is stopped during the transient operating condition, the estimated value of the mixture ratio of fuel does not indicate inappropriate even if the mis-fire occurs under the lean burn condition. The ignition timing can appropriately be maintained. Consequently, the reduction of engine driveability and exhaust gas emission characteristic can be prevented.

It will fully be appreciated by those skilled in the art that the foregoing description has been made in terms of the preferred embodiment and various changes and modifications may be made without departing from the scope of the present invention which is to be defined by the appended claims.

What is claimed is:

1. A system for controlling an ignition timing for an internal combustion engine, comprising:
   a) first means for detecting engine driving conditions, the engine being driven with a particular fuel containing an alternative fuel, the engine having a lean air/fuel mixture ratio;
   b) second means for detecting an inner cylinder pressure of the engine;
   c) third means for detecting whether the engine operating conditions fall in a predetermined transient operating state;
   d) fourth means for setting a basic ignition timing for the particular fuel on the basis of the engine operating conditions;
   e) fifth means for detecting a crank angular position at which the inner cylinder pressure becomes maximum on the basis of an output signal derived from the second means;
   f) sixth means for calculating an ignition timing feedback correction quantity $\Delta_1$ for the ignition timing for avoiding occurrence of engine knock and/or generating a maximum torque as derived from the signal of the second means;
   g) seventh means for comparing the crank angular position at which the inner cylinder pressure becomes maximum with the current ignition timing to estimate a percentage of alternative fuel to the particular fuel and hating the estimation when the engine is transferred into the predetermined transient condition;
   h) eighth means or calculating a second correction quantity $\Delta_2$ for the ignition timing according to the estimated percentage of mixture of the alternative fuel;
   i) ninth means for correcting the basic ignition timing using the first and second correction quantities to determine a final ignition timing; and
   j) tenth means for igniting the air/fuel mixture supplied to the engine at a time derived by the ninth means.

2. A system for controlling ignition timing as set forth in claim 1 wherein the particular fuel is gasoline and the alternative fuel is alcohol.

3. A system for controlling ignition timing as set forth in claim 2, wherein the first means includes a first sensor detecting engine revolution speed and a second sensor detecting a basic fuel injection quantity which indicates engine load.

4. A system for controlling ignition timing as set forth in claim 3, wherein the fourth means sets the basic ignition timing BASE from the values of the engine revolution speed N and a basic ignition pulsewidth indicating the basic fuel injection qauntity $T_p$.

5. A system for controlling ignition timing as set forth in claim 4, wherein the fifth means converts the inner cylinder pressure signal derived from the second means into digital values at each engine crank revolution of 1 degree, within a predetermined crank angle interval, and detects the crank angular position as $\theta_{pmax}$ when the converted digital value becomes maximum within the predetermined crank angle interval.

6. A system as set forth in claim 5, wherein the seventh means estimates the percentage of alcohol concentration in the fuel from the calculated combustion duration of the fuel.

7. A system for controlling ignition timing as set forth in claim 6, wherein the second correction quantity $\Delta_2$ is the sum of a third correction quantity $\Delta_{21}$ and fourth correction quantity $\Delta_{22}$, the third correction quantity $\Delta_{21}$ being derived on the basis of engine load $T_p$ and the estimated percentage R of the fuel mixture and the fourth correction quantity being derived on the basis of the engine revolution speed N and the estimated percentage R.

8. A system for controlling ignition timing as set forth in claim 7 wherein the feedback correction quantity $\Delta_1$ is the sum of a fifth correction quantity $\Delta_{11}$ and a sixth correction quantity $\Delta_{12}$, the fifth correction quantity $\Delta_{11}$ being such that the ignition timing is largely retarded when engine knock occurs and is slightly advanced when no engine knock occurs and the sixth correction quantity is derived from a proportional operation of the ignition timing control based on the difference between a predetermined crank angle at which an engine efficiency becomes maximum $\theta_r$ and $\theta_{pmax}$.

9. A system for controlling ignition timing as set forth in claim 8, wherein the seventh means adopts the most recent estimated value of the percentage R of the fuel mixture under steady engine operating conditions, not transient operating conditions, at any time when said seventh means halts the estimation of the percentage R of the mixture.

10. A system for controlling ignition timing as set forth in claim 9, wherein predetermined transient operating conditions refers to the engine acceleration state and wherein the third means includes an acceleration sensor for detecting a predetermined acceleration state of the engine, the acceleration sensor being constituted by a sensor for detecting an opening angle of an engine throttle valve so that the predetermined acceleration state is detected by a change in width of the opening angle of the throttle valve.

11. A method for controlling ignition timing for an internal combustion engine, comprising the steps of:

a) detecting driving conditions, the engine being driven with a fuel containing a particular fuel and alternative fuel and the engine driving conditions including a range in which the engine is at least driven with a lean air/fuel mixture ratio;
b) detecting an inner cylinder pressure of the engine;
c) detecting whether the engine operating conditions fall in a transient operating state;
d) setting a basic ignition timing for conventional fuel on the basis of the engine operating conditions;
e) detecting a crank angular position at which the inner cylinder pressure becomes maximum on the basis of an output signal derived in the step b);
f) calculating an ignition timing feedback correction quantity for the ignition timing for at least avoiding occurrence of at least one of engine knock or generating maximum torque as derived from the signal of step b);
g) comparing the crank angular position at which the inner cylinder pressure becomes maximum with the current ignition timing to estimate the percentage of alternative fuel to particular fuel and halting the estimation when the engine is transferred into the predetermined transient driving condition;
h) calculating a second correction quantity for the ignition timing according to the estimated percentage of mixture;
i) correcting the basic ignition timing using the first and second correction quantities to determine a final ignition timing; and
j) igniting the air/fuel mixture supplied to the engine on the basis of the determination made in the step i).

* * * * *